Aug. 16, 1932.  W. A. GEIGER  1,871,451
RAILWAY DRAFT RIGGING
Filed March 10, 1928
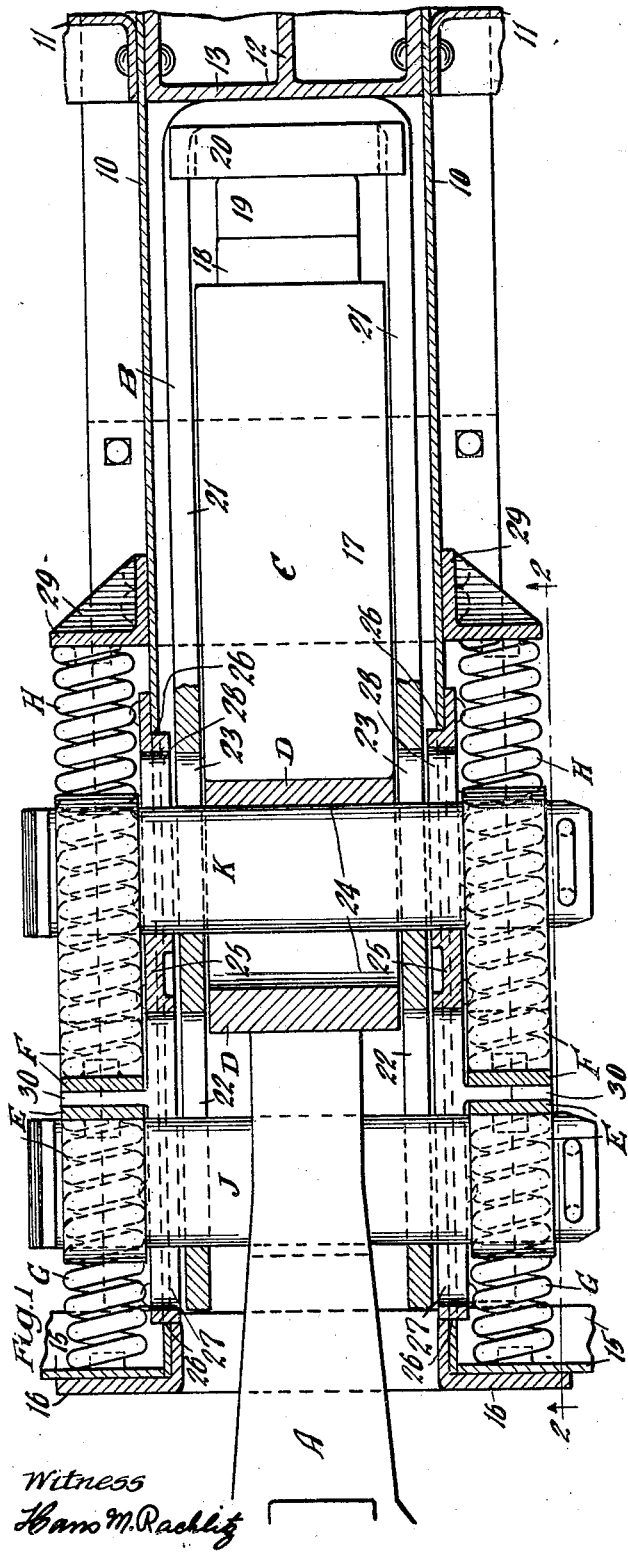
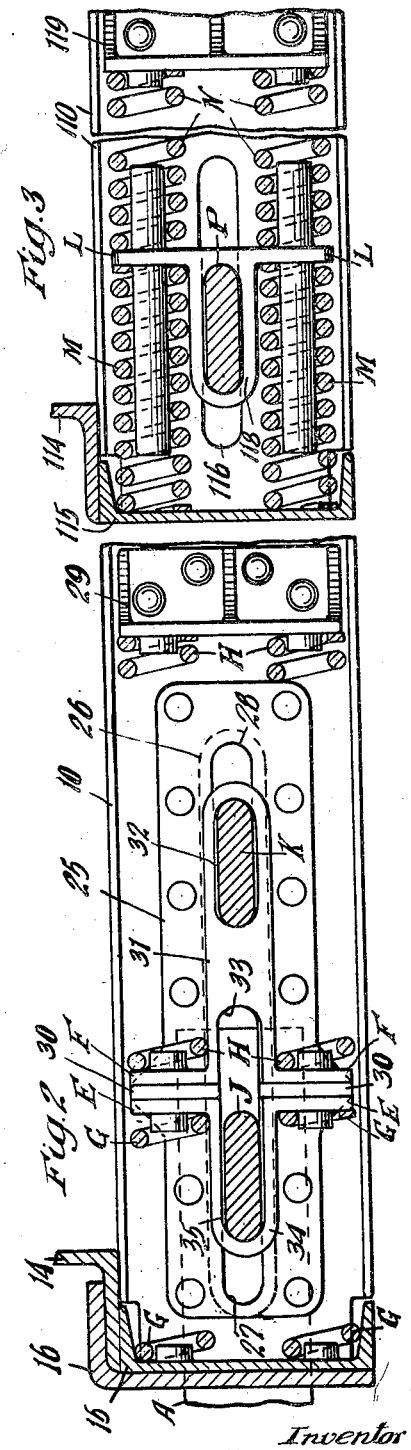
Witness
Hans M. Rachlitz
Inventor
William A. Geiger
By Joseph Harris
His Atty.

Patented Aug. 16, 1932

1,871,451

UNITED STATES PATENT OFFICE

WILLIAM A. GEIGER, OF CHICAGO, ILLINOIS, ASSIGNOR TO W. H. MINER, INC., OF CHICAGO, ILLINOIS, A CORPORATION OF DELAWARE

RAILWAY DRAFT RIGGING

Application filed March 10, 1928. Serial No. 260,560.

This invention relates to improvements in railway draft riggings.

In the operation of railways, there is a constant tendency toward longer trains and larger and heavier cars, thereby demanding high capacity in shock absorbing mechanisms, and especially in buff. On account of the restrictions and limitations as to the permissible space which may be occupied by the shock absorbing mechanism, and, further, due to the necessity of avoiding increased train slack, some difficulty has been experienced in fulfilling the requirements for increase in shock absorbing devices.

One object of the invention is to provide an improved arrangement of railway draft riggings, wherein increased capacity is obtained in buff by providing a relatively longer stroke of the mechanism without increasing the stroke in draft.

Another object of the invention is to provide a railway draft rigging of the character indicated, wherein additional capacity is obtained in buff by lengthening the stroke of the shock absorbing mechanism and providing, in addition, independent spring shock absorbing means which is located exterior to the draft sills and is actuated during the latter part of the buffing stroke in unison with the friction shock absorbing device.

A further object of the invention is to provide a railway draft rigging having a draft movement of standard length and a buffing stroke in excess of the draft movement, including a friction shock absorbing mechanism which is actuated during the entire buffing stroke, and a spring shock absorbing means independent of the friction shock absorbing mechanism which is actuated during the latter part of the buffing action and in unison with the friction shock absorbing mechanism, and wherein an additional spring device is provided which acts as a centering means for the coupler and is also effective in draft to provide spring resistance in addition to the resistance afforded by the friction shock absorbing means.

A still further object of the invention is to provide, in a draft rigging for railway cars including a shock absorbing means actuated by the coupler shank connected to the yoke enclosing the shock absorbing mechanism and relatively to which the coupler is movable in buff, yielding means for maintaining the coupler properly centered.

More specifically, an object of the invention is to provide a railway draft rigging including the usual draft sills, a friction shock absorbing means between the sills, a yoke enclosing the friction shock absorbing means and connected to the coupler, spring shock absorbing means exterior to the draft sills actuated in unison with the friction shock absorbing mechanism during the last part of the buffing stroke through the medium of a key extending through the yoke and co-operating with the coupler, a coupler key connecting the yoke to the coupler to actuate the friction shock absorbing mechanism in draft, and centering spring means co-operating with the coupler key for centering the coupler.

In the drawing, forming a part of this specification, Figure 1 is a horizontal, longitudinal, sectional view of a portion of a railway draft rigging, showing my improvements in connection therewith. Figure 2 is a longitudinal, vertical, sectional view, partly in side elevation, taken along the line 2—2 of Figure 1 and showing the front end portion of the improved mechanism. Figure 3 is a view similar to Figure 2, but showing a different embodiment of the invention.

Referring to the construction illustrated in Figures 1 and 2, 10—10 indicate the usual channel-shaped center or draft sills of a railway car under-frame. The body bolster is designated by 11 and the usual center filler casting 12 is associated with the bolster and is disposed between the draft sills, the same having a transverse front end wall 13 functioning as a rear abutment for the shock absorbing mechanism. The usual angle end sill is designated by 14, to which is secured the end sill proper 15 which has the usual central opening to accommodate the shank of the coupler at the corresponding end of the car. A combined striking plate and carry iron 16, of well known type, is secured to the end sill, the angle sill 14 and the draft sills 10—10.

In carrying out my invention, as illustrated in Figures 1 and 2, I employ a coupler A which may be of standard design, a yoke B operatively connected to the coupler, a friction shock absorbing device C, a front follower block D, a pair of front spring followers E, a pair of rear spring followers F, centering spring elements G, buffing spring elements H, and keys J and K.

The friction shock absorbing mechanism C may be of any well known design, with the parts so proportioned that the travel in compression is greater than customary. In the present instance, the shock absorbing mechanism is shown of that type having a friction shell and cooperating friction elements and as herein shown, comprises a friction shell or casing 17, a pair of friction shoes 18 cooperating with the shell, and a main wedge block 19, movement of the shoes being resisted by spring means within the shell, not shown. The friction shock absorbing device is disposed within the yoke B and has the wedge member 19 thereof bearing on a follower 20 which is interposed between the rear end connecting section of the yoke and the friction shock absorbing device. The front end of the friction casing or shell bears directly on the front follower block D. The front follower block D is interposed between the side arms of the yoke member B.

As shown, the yoke member B is horizontally disposed and is of U-shaped form, having longitudinally extending side arms 21—21. The side arms are provided with aligned slots 22—22 at the forward ends thereof, adapted to accommodate the usual coupler key. Inwardly of the slots 22, the side arms are provided with an additional set of aligned slots 23—23, adapted to accommodate the key K which serves as a stop for the front follower block D during a draft action and as a pressure transmitting device in co-operating with said block during a buffing action. As shown, the block D is slotted, as indicated at 24, to accommodate the key K. The slot is of such a length as to permit relative movement of the block D and key K during a buffing movement of the coupler A.

The coupler A is connected to the yoke B by means of the transverse key J, which extends through an opening provided in the coupler shank and the aligned openings 22 of the side arms 21 of the yoke B.

In order to properly guide the keys J and K, and also to limit their movements during the operation of the shock absorbing mechanism, I provide cheek plates 25—25 which have guide slots therein for the keys J and K. The cheek plates 25, as illustrated in Figures 1 and 2, are riveted to the outer sides of the draft sills and are provided with lateral, longitudinally disposed, enlarged sections, which are accommodated within longitudinally disposed openings or slots 26 provided in the draft sills. Each of the cheek plates 25 is provided with a relatively long slot 27 at the forward end thereof, and a shorter slot 28 at the rear end. The slots 27 of the two cheek plates are aligned and accommodate the outer end portions of the key J for movement. The slots 28 at the rear ends of the cheek plates 25 are also aligned and accommodate the outer ends of the key K for movement. As clearly illustrated in Figures 1 and 2, the slots 28 are shorter than the slots 27. In the normal full release position of the parts, the key K is in abutment with the front end walls of the slots 28 and engages the inner end wall of the slot 24 of the front follower block D, thereby serving as limiting stop means for the front end of the friction shell or casing 17 of the friction shock absorbing device. In this connection, it is pointed out that the slot 24 of the block D is of such a length as to permit a certain amount of inward movement of the block D with respect to the key K before the key is engaged by the front end wall of the slot of the block D to move the key inwardly of the mechanism. As shown in Figure 1, the key J is normally held in engagement with the front end walls of the slots 22 of the side members of the yoke B and in spaced relation to the front end walls of the slots 27 of the cheek plates. It will be noted that in this position of the parts, the key J is spaced a greater distance from the rear end walls of the slots 27 than from the front end walls of the slots of the same. Greater movement is thus provided in buff than in draft. Although the amount of movement permitted in both buff and draft may be varied, the parts are preferably so designed that there will be approximately two and one-half inches of movement in draft and five inches of movement in buff.

The buffing spring resistance H comprises two sets of spring elements arranged on opposite sides of the sills, each set preferably comprising two springs disposed above and below the key K and having the rear ends thereof bearing on fixed abutment brackets 29—29 secured to the outer sides of the draft sills 10. At the forward end, the members of each set of spring elements H bear on the spring follower F, which has its outward movement limited by a stop member 30 projecting laterally from the corresponding cheek plate. As shown in Figure 2, the top and bottom sections of the stop member 30 are separated by the slot 27 of the cheek plate. Each spring follower F comprises a plate-like section having a rearward extension in the form of an arm 31 which is slotted at the rear end, as indicated at 32, to accommodate the corresponding outer end of the key K. As shown, the key K closely fits the opening 32 so that the spring follower F will have movement in unison with the key in both inward and outward directions. At the forward end, the arm 31 of each follower F is recessed as indicated at 33, the inner end wall of the recess 33 being in alignment with the inner end of the corresponding slot 27 in the normal position of the parts, so as to permit the required inward movement of the coupler key J during buff without being interfered with by the spring followers F.

The centering spring elements are arranged in sets on the outer sides of the draft sills, each set preferably comprising two coils arranged above and below the key J. The forward ends of the coils of the springs G bear directly on the inner side of the end sill 15 and the inner ends thereof bear directly on the front spring followers E, which are interposed between these springs and the stops 30. Each of the spring followers E have top and bottom platelike sections which form the abutments for the springs. Each has a forwardly extending arm 34, which is slotted as indicated at 35 to accommodate the corresponding end of the key J. As shown, the slot 35 is open at the rear end and in alignment with the recess 33 of the rear spring follower F at the same side of the mechanism, the slot 35 and the recess or opening 33 forming, in effect, a continuous slot when the parts are in the normal position. The key J is normally forced inwardly by the centering springs G and is held in engagement with the inner end of the slot in the coupler shank, thereby holding the flat rear end portion of the coupler shank in engagement with the front follower block D, thus maintaining the coupler centered and preventing lateral tilting of the same. It will be evident that inasmuch as the springs G bear on opposite ends of the key J, a rocking tendency of the key and the coupler A in a lateral direction will be yieldingly resisted.

The operation of the improved railway draft rigging, as illustrated in Figures 1 and 2, assuming a buffing action, is as follows: Upon inward movement of the coupler A, the front follower block D will be forced inwardly, thereby transmitting the actuating force directly to the friction shock absorbing device C, which is held against movement by the rear follower 20 which engages the end section of the yoke, the latter being held against movement by the stop casting 12. During the first part of the buffing action, the friction shock absorbing mechanism C only will be actuated, relative movement between the front follower block D and the key K being permitted by the lost motion connection provided by the slot 24 which accommodates the key. When the lost motion has been taken up, the key K will be directly actuated through the block D, thereby pulling the spring followers F inwardly and compressing the spring resistance elements H between the same and the abutments 29. This action will continue until inward movement of the key K is limited by engagement with the rear end walls of the slots 23 of the cheek plates. During release, the springs H will force the key K outwardly and the expansion of the friction shock absorbing device C will force the block D outwardly until limited by engagement with the key K, the latter being limited in its outward movement by engagement with the front end walls of the slots 28 of the cheek plates. It will be noted that during the buffing action, the coupler key J is moved substantially in unison with the coupler A and that this movement will be accommodated by the slots 35 in the front spring followers E and by the openings 33 in the arms of the rear spring followers F.

During a draft action, the key J will be pulled forwardly in unison with the coupler A and through the medium of the key the yoke B will be pulled forwardly also, thereby compressing the friction shock absorbing device between the follower 20 and the front follower block D which is held substantially stationary by the key K. Forward movement of the yoke B is limited by engagement of the rear end walls of the key-receiving slots of the yoke B coming in engagement with the key K. During the forward movement of the coupler, the key J, which is movable therewith, will also effect compression of the centering springs G.

Referring to the embodiment of the invention illustrated in Figure 3, it is pointed out that the operation of the mechanism is substantially the same as that shown in Figures 1 and 2, but that the centering springs and the buffing springs, which act in addition to the friction shock absorbing device, are associated with a yoke which is vertically disposed and a railway draft rigging wherein front and rear stop lugs are provided on the draft sills. In this type of railway draft rigging, it is the custom to employ only a single key member which connects the coupler shank to the yoke. This key is indicated by P in Figure 3. In Figure 3, the draft sill is designated by 110, the angle end sill by 114, and the end sill by 115. The arrangement of the parts just referred to is the same as that in Figures 1 and 2, and the usual combined striking casting and carry iron is also employed. The key P, which connects the coupler to the yoke, extends through aligned slots 116 which are provided in the draft sills. Secured to the opposite ends of the key are spring followers, one of which is shown and designated by the character L. Each spring follower comprises a slotted arm 118 which receives the corresponding end of the key, the spring follower being thus connected to the key to move in unison therewith. Each spring follower has top and bottom vertically disposed platelike sections which cooperate directly with the centering and buffing springs. The centering springs M, as shown in Figure 3, comprise upper and lower coils which are interposed between the end sill 15 and the spring follower L. The buffing springs N also comprise top and bottom coils which are interposed between the spring follower L and a stop bracket 119.

The centering springs M act to center the coupler in a manner similar to the springs G, hereinbefore referred to. Inasmuch as the coupler key is movable with the coupler in buff, the buffing springs N will be compressed at the same time that the friction shock absorbing mechanism is operated.

From the preceding description, taken in connection with the drawing, it will be evident that I have provided a railway draft rigging having relatively long stroke during buff to take care of heavy shocks, wherein the shocks are resisted by both a friction shock absorbing device and a spring shock absorbing means, the latter being effective after a predetermined compression of the mechanism, and wherein a relatively shorter stroke is provided in draft, during which the friction shock absorbing device is, in effect, actuated alone, a slight additional resistance being provided by centering springs which are effective to center the coupler and prevent lateral tilting of the same.

While I have herein shown and described what I consider the preferred manner of carrying out of my invention, the same is merely illustrative and I contemplate all changes and modifications which come within the scope of the claims appended hereto.

I claim:

1. In a railway draft rigging, the combination with draft sills; of a friction shock absorbing mechanism interposed between the sills; a coupler; a pressure transmitting block interposed between the coupler and the friction shock absorbing mechanism; a yoke enclosing the friction shock absorbing mechanism; an independent spring shock absorbing means; a key having a lost motion connection with the yoke and also having a lost motion connection with the pressure transmitting block and co-operating with the spring shock absorbing means, whereby the actuating force is transmitted to the friction shock absorbing mechanism during the entire compression stroke during buff and through the pressure transmitting block to the spring shock absorbing means after a predetermined compression of the friction shock absorbing mechanism.

2. In a railway draft rigging, the combination with draft sills; of a shock absorbing means disposed between said sills; a coupler; a yoke connected to the shock absorbing means to compress the same in draft, said yoke having a lost motion connection with the coupler to permit inward movement of the coupler during a buffing action to compress said shock absorbing means; and spring means at opposite sides of the draft sills connected to the coupler for centering the coupler, said spring means being compressed by outward movement of the coupler in draft.

3. In a railway draft rigging, the combination with draft sills; of a shock absorbing means disposed between said sills; a coupler cooperating with the shock absorbing means to compress the same during a buffing action; a yoke connected to the shock absorbing means to compress the same in draft, said yoke having a lost motion connection with the coupler to permit inward movement of the latter during a buffing action to compress said shock absorbing means, said lost motion connection including a key extending through slots in the coupler shank, yoke and draft sills; and spring means at opposite sides of the sills co-operating with said key to center the coupler, said springs opposing outward movement of the coupler and being compressed by the outward movement thereof in draft.

4. In a railway draft rigging, the combination with draft sills; of a shock absorbing means disposed between said sills; a coupler cooperating with the shock absorbing means to compress the same in draft; a yoke operatively connected to the shock absorbing means, said yoke having a lost motion connection with the coupler to permit inward movement of the latter during a buffing action to effect compression of the shock absorbing means, said lost motion connection including a key extending through an opening in the coupling shank and aligned slots in the yoke and draft sills, said key cooperating with the yoke to move the same outwardly in draft to compress the shock absorbing means; and springs at opposite sides of the sills bearing on said key and yieldingly forcing the same rearwardly of the mechanism to center the coupler, said springs being compressed by the outward movement of said key with the coupler in draft.

5. In a railway draft rigging, the combination with draft sills; of a shock absorbing mechanism between said sills; spring shock absorbing means exterior to the draft sills; a coupler cooperating with said friction shock absorbing means to compress the same during the entire permissible buffing stroke of the mechanism; means for transmitting the actuating force from the coupler to said spring shock absorbing means after a predetermined compression of the mechanism during buff; means for transmitting the actuating force to the friction shock absorbing mechanism during draft; and yielding means for centering the coupler, said yielding means being compressed during the draft stroke in unison with the friction shock absorbing mechanism to augment the resistance.

6. In a draft rigging, the combination with draft sills; of a friction shock absorbing device disposed between said sills; a spring resistance disposed on the outer sides of the sills; permanently fixed abutment means at the inner end of said spring resistance; movable follower means at the front end of said spring resistance; a coupler; means actuated by the coupler in buff to compress said friction shock absorbing device to the full extent of the compression stroke thereof in buff, said means having a lost motion connection with said follower for actuating the spring resistance in buff after a predetermined compression of the friction shock absorbing device; and a yoke acting means connected to the coupler for actuating the friction device in draft to compress the same to an extent less than the complete compression stroke thereof in buff.

In witness that I claim the foregoing I have hereunto subscribed my name this 8th day of March 1928.

WILLIAM A. GEIGER.